United States Patent [19]

Veltman

[11] Patent Number: 4,713,226

[45] Date of Patent: Dec. 15, 1987

[54] PROCESS FOR PRODUCING FINELY DIVIDED LIMESTONE FOR SULFUR OXIDE REMOVAL

[75] Inventor: Preston L. Veltman, Severna Park, Md.

[73] Assignee: A/S Niro Atomizer, Soeborg, Denmark

[21] Appl. No.: 904,425

[22] Filed: Sep. 8, 1986

Related U.S. Application Data

[62] Division of Ser. No. 548,126, Nov. 2, 1983, Pat. No. 4,629,130.

[51] Int. Cl.⁴ .......................... C01B 17/00; B01J 8/00

[52] U.S. Cl. .......................... 423/242; 423/244

[58] Field of Search .............. 423/242 A, 242 R, 430, 423/244 A, 244 R

[56] References Cited

U.S. PATENT DOCUMENTS

| | | | |
|---|---|---|---|
| 2,096,030 | 10/1937 | Cooke | 106/36.2 |
| 2,718,453 | 9/1955 | Beckman | 423/244 |
| 3,920,800 | 11/1975 | Harris | 423/161 X |
| 3,989,195 | 11/1976 | Falcon-Steward | 241/16 |
| 4,219,590 | 8/1980 | Shibazaki et al. | 427/215 |
| 4,272,498 | 6/1981 | Faatz | 423/242 |

FOREIGN PATENT DOCUMENTS

| | | |
|---|---|---|
| 2346269 | 5/1976 | Fed. Rep. of Germany . |
| 2741427 | 7/1978 | Fed. Rep. of Germany . |
| 2094279 | 9/1982 | United Kingdom . |

OTHER PUBLICATIONS

Kinetic and Engineering Aspects on the Wet-Dry FGD Process, by Jonas Klingspor, Leientiste Thesis, Jun. 1983, Dept. of Chemical Engineering II, Lund Institute of Technology, Sweden.

*Primary Examiner*—Gregory A. Heller
*Attorney, Agent, or Firm*—Armstrong, Nikaido, Marmelstein & Kubovcik

[57] ABSTRACT

A process for providing finely divided limestone products. Limestone is abrasively ground in an aqueous media in the presence of added dissolved carbon dioxide or in the presence of a soluble acid-forming compound, the anion of which forms a soluble calcium compound, or in the presence of both dissolved carbon dioxide and an acid-forming compound.

A dry flue gas desulfurization process using the finely divided limestone product of the process of the invention is also provided.

10 Claims, 3 Drawing Figures

PROCESS FOR PRODUCING FINELY DIVIDED LIMESTONE FOR SULFUR OXIDE REMOVAL

This application is a division of prior application Ser. No. 548,126, filed Nov. 2, 1983 now U.S. Pat. No. 4,629,130.

DESCRIPTION

1. Technical Field

This invention relates to the production of finely divided limestone. More particularly, this invention relates to the production of finely divided limestone by the grinding of limestone in an aqueous media.

2. Background Art

Pulverized limestone ranks second, after sand and gravel, of all large tonnage commodities used in the United States. Particle size is a most important factor when limestone is utilized as a chemical reactant. Particle size and chemical purity are most important factors when limestone is used in pigments, paper and plastics manufacture. One of the most widely utilized properties of limestone is its ability to neutralize acidic materials. In neutralization applications weight average particle size and surface area available for reaction are critically important reaction rate controlling factors. When limestone is used as a pigment, or as a filler in coatings, paper, and plastics manufacture the presence of anions more acidic than carbonate are avoided because they reduce finished product stability.

Finely divided limestone is now commercially available to the paint and plastics industries in dry or slurry form ranging in size down to 0.7 micron average particle diameter. The power cost of producing particulate limestone in the few and sub-micron range by conventional grinding methods restricts its large tonnage industrial use such as required for flue gas desulfurization.

The use of limestone in flue gas desulfurization is well known. In the so-called wet flue gas desulfurization (FGD) process it has been established that if one reduces the particle size of limestone so that approximately 84 percent passes a 325 mesh screen (44 microns), quantitive reaction of limestone with a solution of SOx in water can be obtained. Such is not the case if one attempts to react particles of limestone of about through 325 mesh with SOx in a dry reaction environment as obtained in a spray drying operation (as encountered is a so-called dry flue gas desulfurization process).

In a dry FGD process operated under conditions as herein disclosed it has been established that limestone particulates substantially smaller than about three microns average diameter of particles on a weight basis are required to obtain greater than approximately 90% removal of SO2 from a flue gas containing 1000 ppm using one molecular weight of limestone per molecular weight of SOx removed. It is also known that the reactivity of a given mass of particulate limestone towards SO2 is directly related to particle size. Specifically, the surface available for reaction per unit weight is directly related to particle size. As the average particle size of a given reactive material is decreased, the surface area per unit weight available for reaction increases some what exponentially as the particles become progressively smaller below approximately one micron diameter.

The cost of conventional grinding to obtain few micron and sub micron particle size limestone is an important commercial factor. Mechanical grinding of limestone, as by a conventional ball mill, is energy intensive. As one progressively subdivides a given mass of limestone to smaller and smaller particles, the energy requirement increases rapidly as the average particle size decreases. The cost of grinding is a major economic limiting factor particularly in large tonnage operations such as that required for flue gas desulfurization.

Published UK Patent Application GB No. 2 094 279A discloses a non-mechanical method of converting coarsely ground limestone to a very fine powder. According to the published application, an aqeuous slurry of relatively coarsely ground limestone is contacted with carbon dioxide gas at high pressure to convert the solids in the slurry at least in part to an unstable calcium bicarbonate. The carbon dioxide pressure is then instantaneously released to form a slurry of calcium carbonate particles substantially reduced in size. The process of GB No. 2 094 279A, however, is believed commercially unattractive because, as described in the publication the reaction takes several hours to complete.

It is an object of the present invention to provide means whereby chemically pure calcium carbonate particulates having a mean weight particle diameter of substantially below five microns and suitable for applications such as paint, plastics and paper manufacture can be produced economically thus permitting large tonnage use.

It is further object of the present invention to provide a process for producing very finely divided calcium carbonate that is less energy intensive than conventional mechanical grinding methods and which does not require the long times and costly high pressure vessels used in the non-mechanical process of the published UK patent application.

It is still a further object of the present invention to provide a process for producing a finely divided calcium carbonate product that is uniquely suitable for dry flue gas desulfurization.

DISCLOSURE OF THE INVENTION

According to the present invention, these and other objects are achieved by a process wherein limestone in an aqueous slurry is ground in the presence of dissolved carbon dioxide and/or in the presence of an acid forming material selected from the group consisting of calcium chloride, ferrous and/or ferric chloride, aluminum chloride, and magnesium chloride; or from the group of acids hydrochloric, hydrobromic, nitric, or acetic; or from the group chlorine or bromine.

In a particularly preferred embodiment of this invention a tower mill is used in conjunction with a rotary atomizer.

The process of the present invention can produce chemically pure calcium carbonate particulates having mean particle diameters of substantially less than five microns and as low as the sub-micron range, using carbon dioxide in the grinding operation. The slurry product produced in the process of the invention comprising calcium chloride is uniquely suitable for use in dry flue gas desulfurization.

MODES FOR CARRYING OUT THE INVENTION

Figure 1:
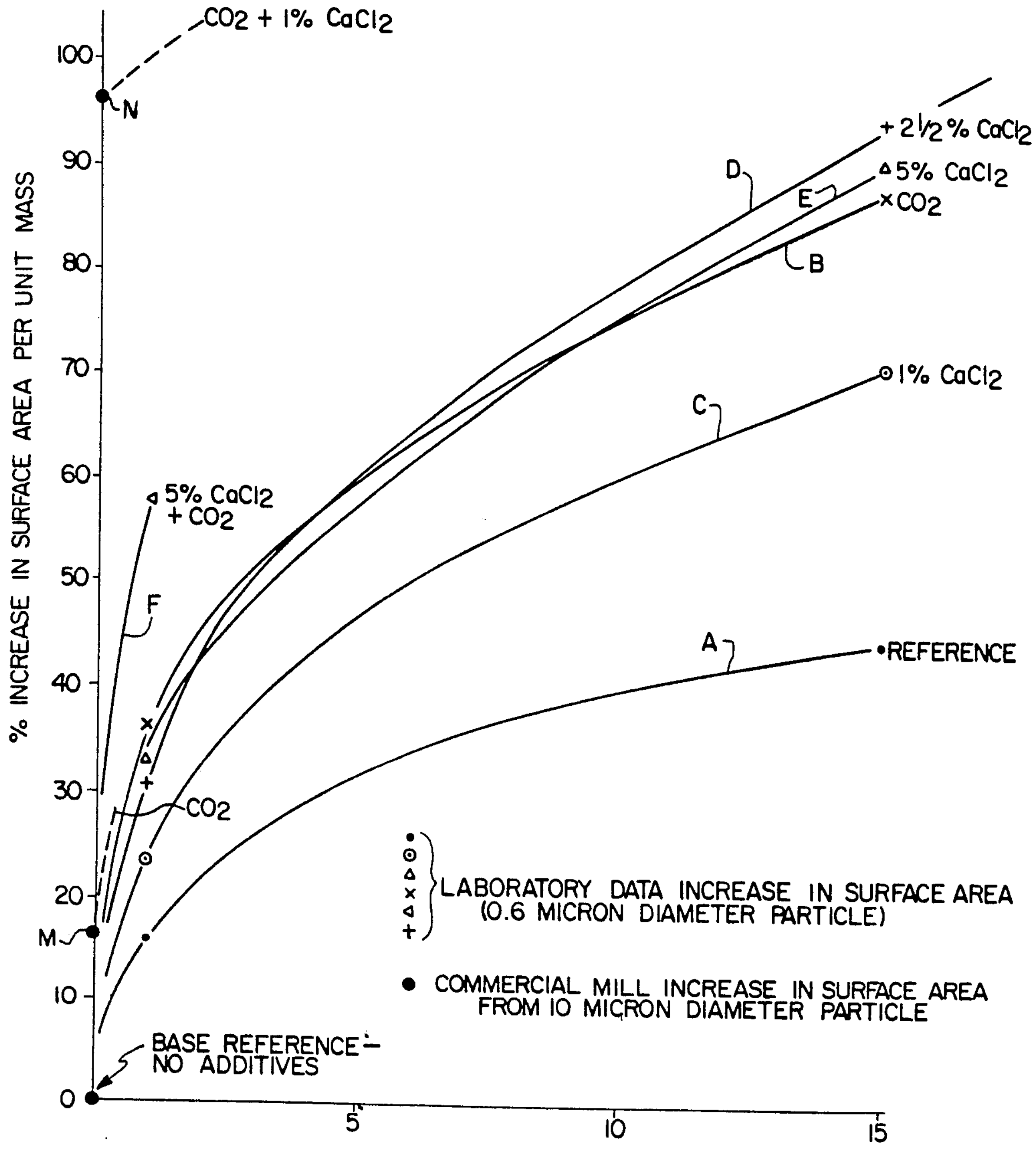
FIG. 1 is a graph showing the effectiveness of utilizing carbon dioxide, calcium chloride, each separately and in combination to accomplish particle disintegration of calcium carbonate in an aqueous slurry at equal power inputs by the process of this invention.

The process of the present invention for producing finely divided calcium carbonate comprises grinding limestone in an aqueous media in the presence of dissolved carbon dioxide and/or in the presence of agents reactive with calcium carbonate and which do not form insoluble precipitates other than calcium hydroxide. The grinding process is typically carried out at ambient temperature.

The term grinding as used herein refers to an abrasive type of grinding as is obtained in a tower, or other, attrition mill in which shear or abrasive forces are applied to the limestone to cause disintegration. Such shear forces and abrasive forces are preferably primarily generated between moving milling media. Abrasive grinding as used in the process of the present invention does not include any substantial amount of impact type of grinding such as generated in hammer mills or horizontal ball mills. Grinding in the process of the invention is thus accomplished primarily by a rubbing action as opposed to an impact, or hammering, action.

Further particle subdivision from the 5 to 10 micron range into the few micron and sub micron range may be obtained as in an atomizer wheel using as feed a product of a grinding operation of this invention.

A vertical ball mill, known in the trade as a tower mill, and sold by Mineral Processing Systems, Incorporated, York, Pa, is particularly suitable for providing a major part of the milling energy, i.e. shear and abrasive forces, for grinding limestone in the process of the present invention. Tower mills are now used to produce 10–44 micron particles for wet process flue gas desulfurization. A tower mill is a vertical mill comprising a column of vertically disposed grinding media to which energy is supplied by a rotating screw member. The grinding medium used in a commercial Tower mill, useful in the process of this invention, known as the KW-20 tower mill, comprised a mixture of steel balls consisting of 1400 pounds of ¼" diameter, 1400 pounds of ⅜" diameter, and 1700 pounds of ¾" to 1" diameter. The tower mill screw speed was 83 RPM. In practice the size of the grinding medium in the tower mill is varied dependent on the feed size; smaller feed requiring smaller grinding media. A tower mill also permits autogenous grinding by using limestone at least in part as a grinding material having a larger size than the feed size.

Limestone in an aqueous media is subjected to grinding in the process of the present invention to produce few micron and submicron particles of calcium carbonate. The limestone used as a starting material is in the form of particles having a size which depends on the particular milling device used to perform the grinding operation. When a tower mill having the grinding medium distribution as above described is used for the grinding, the limestone fed to the mill will typically have a particle size of about through 3/16 inch diameter or less. The amount of limestone in the aqueous medium is not particularly limited as long as the shear and abrasive forces necessary for disintegration of the limestone can be applied to the limestone. The pressure on the aqueous medium is proportional to the height of the tower employed. The saturation concentration of carbon dioxide in the aqueous medium is dependent on the pressure. Typically a slurry of limestone in water in an amount of from 30 to 50% by weight is used in the process of the invention.

A characteristic feature of the process of the present invention is that the grinding of the limestone is carried out in the presence of carbon dioxide dissolved in the aqueous media. The amount of carbon dioxide used in the process is preferably that amount necessary to maintain saturation of the aqueous medium during grinding although an aqueous medium only partially saturated in amount of at least about 50% of saturation is believed to be commercially useful. The disintegrating effect provided by the carbon dioxide is not fully realized if the aqueous medium is not saturated with the carbon dioxide. The carbon dioxide can be provided in any convenient form including, for example, carbon dioxide in solid form, i.e. dry ice which vaporizes insitu or by gaseous carbon dioxide or by carbon dioxide formed by insitu chemical reaction as promoted by acids having anions which form soluble calcium compounds. Recycle of carbon dioxide is a preferred embodiment.

According to the present invention, a water solution of carbon dioxide at ambient pressure, even near atmospheric pressure, when used in a grinding system, has been demonstrated to function as though it were under a high external pressure and to provide particulate calcium carbonate having a weight average particle diameter of less then 10 microns and as small as substantially less than 1 micron. The disintegration of the starting limestone particulates into smaller particulates is extremely rapid and does not require long processing time.

Although the exact mechanism is not known, it is believed that high point pressures exist in the grinding system of this invention and that the water solution of carbon dioxide at the site of particle disintegration functions as though it were under a high external pressure.

In another embodiment of of the process according to the present invention, the grinding of the limestone is carried out in the presence of carbon dioxide and other soluble materials capable of interacting with limestone without forming insoluble products other than calcium hydroxide. Calcium chloride has been found to be particularly useful in the process of the present invention. Applicant does not wish to be bound by theory but it is believed that dissolved calcium chloride is at least partially hydrolyzed in the presence of water thereby in equilibrium forming calcium hydroxide and hydrochloric acid providing a slightly acidic environment. The hydrochloric acid is then available to react with adjacent calcium carbonate molecules to reform calcium chloride with the production of carbon dioxide which can function to disintegrate limestone thru bicarbonate formation or a portion of which may escape as a gas from the system. Thus one molecule of calcium chloride can participate in the dissociation or grinding of many particles of limestone with the net production of finely divided calcium carbonate and minor amounts of hydroxide.

Other compounds which are useful are those which also provide a slightly acidic environment in which the $CO_2$-water system can work, including, for example, ferrous and ferric chloride, aluminum chloride and magnesium chloride; acids including hydrochloric, hydrobromic, nitric and acetic acids and chlorine and bromine. It is believed that an anion capable of displacing carbon dioxide from calcium carbonate, without forming insoluble calcium compounds other than calcium hydroxide, will function as an agent for the production of finely divided limestone. The combined use of suitable acidic agents and carbon dioxide has been found to significantly increase the rate of disintegration of the calcium carbonate as compared to the use of $CO_2$ alone. An amount of these compounds of from at least about 0.5% to about 5.0% by weight of limestone in the grinding system have been found to provide good results in the process of the present invention. With respect to the use of calcium chloride, an amount of from 1.0 to 2.5% provides the best results. The use of greater amounts is not desirable from the standpoints of economy and corrosion.

In a further embodiment of this invention the approximately 5 micron diameter particles, the product of grinding in a tower mill, in the presence of $CO_2$ and $CaCl_2$, are used as feed to an atomizer wheel wherein the limestone particulates issuing from the wheel are predominately in the two micron or smaller range which is a preferred particulate limestone size for SOx capture in a dry FGD operation. The atomizer wheel is preferably of the type used in the spray dryer of a dry FGD process. The rate of revolution required to produce the desired disintegration of the calcium carbonate particles will vary depending on the design of the wheel as can be determined by one skilled in the art.

The finely divided limestone particulates produced by this invention using carbon dioxide alone may be used, for example in pigment, paper, and plastics manufacture where the presence of chlorides and other acidic materials are to be avoided. Further the finely divided limestone particulates of this invention comprise a highly reactive fluid for injection into a combustion device handling coal or other fuel for acid producing gases capture. Further the finely divided reactive limestone may be added to any acidic material or acid forming materials for neutralization purposes.

The present invention may be better understood by referring to the accompanying drawings when read in light of the following description.

FIG. 1 summarizes in graphical form experimental data illustrating the instant process wherein limestone is ground in an aqueous medium: (1) with no additive; (2) saturated with added carbon dioxide at atmospheric pressure; (3) in the presence of calcium chloride; (4) in the presence of carbon dioxide and calcium chloride and (5) in a commercial tower mill comprising the addition of $CO_2$ alone and together with calcium chloride. Data from two sources are shown namely from a commercial tower mill and those developed in the laboratory. A commercially available pigment grade calcium carbonate having a weight mean particle diameter of 0.6 microns was used as a reference material for the laboratory tests. The tower mill data was obtained using a thru ¼ mesh limestone mill feed and when the mill was at equilibrium producing a 10 micron product first carbon dioxide and then carbon dioxide plus calcium chloride was added to determine the effect of these materials on the product produced. Particle size and surface area comparisons are based using standard ASTM rate of sedimentation procedures.

A laboratory high shear mixer, known as a Waring Blender was used as a grinding device for the laboratory work. Reference to FIG. 1 shows the percent increase in surface area obtainable using: (1) no additive (curve A); (2) $CO_2$ (curve B); (3) $CaCl_2$ (curves C, D, and E); (4) combinations of $CO_2$ and $CaCl_2$ (Curve F). Reference to the 15 minute time line of FIG. 1 demonstrates that at equal power some 45% increase in surface area over that obtained without any additive can be obtained by saturating the slurry being ground with carbon dioxide. Approximately a 50% increase in surface area over that obtained without any additive was obtained by the addition of 2½ percent of calcium chloride (curve D). The 5% calcium chloride plus carbon dioxide test (curve F) indicates that the effects of $CO_2$ and $CaCl_2$ are at least additive as confirmed by the tower mill data where 1% calcium chloride and only partial saturation with $CO_2$ obtained nearly a 100% increase in surface area over that obtained by using mechanical energy alone (refer to points M ($CO_2$ alone) and N ($CO_2$ and $CaCl_2$).

Figure 2:
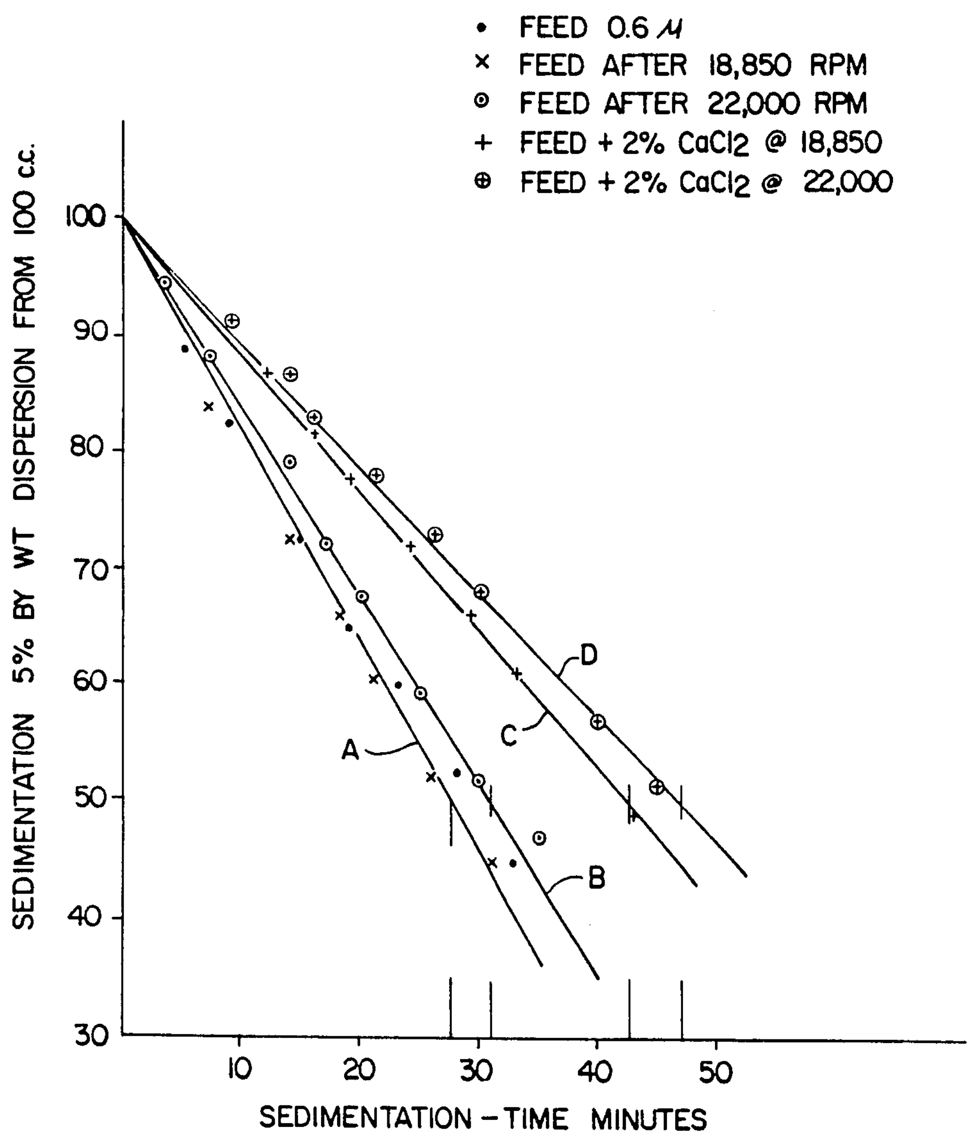
FIG. 2 illustrates limestone grinding characteristics of an atomizer wheel at two levels of power consumption and the effectiveness of calcium chloride as a chemically reactive means to produce finely divided limestone.

FIG. 2 illustrates how limestone particulates can be reduced in particle size as the particulates in aqueous media are passed through an atomizer wheel in the absence and presence of calcium chloride. A commercially available Niro Atomizer "Utility" spray dryer was used for these tests. For the purposes of these tests the dryer was not heated so that the effect of abrasive forces provided by the wheel could be noted directly. The unit was equipped with a 120 mm KN wheel. In a first series of tests the feed to the unit was a 30% by weight aqueous dispersion of a commercially available 0.6 micron average weight diameter calcium carbonate having a 3.7 m2/gm surface area. Two wheel speeds were used namely: 18,850 RPM and 22,000 RPM. In a second identical set of runs calcium chloride, in an amount equal to 2% by weight of the calcium carbonate, was added to the spray dryer feed material. An aqueous slurry product was recovered and tested. Particle size reduction (increased surface area per gram) by the process was determined by observing the rate of sedimentation of a 5% solids dispersion.

Reference to FIG. 2 shows that the sedimentation rate of a 30% solids slurry was unchanged by passage thru the wheel when turning at 18,850 RPM (line A); however, when the wheel speed was increased to 22,000 RPM (line B) the time to reach 50% sedimentation increased from 27.5 minutes to 31 minutes which corresponds to a surface area increase from 3.7 m2/gm to 4.17 m2/gm or a 12.7% increase. Operation at 18,850 RPM and 22,000 RPM (lines C and D; respectively), using the feed containing 2% $CaCl_2$, resulted in wheel products which settled to the 50% point in 42.5 and 47.0 minutes respectively indicating surface areas of product produced of 5.72 m2/gm and 6.32 m2/gm. This data clearly demonstrates the mechanical effectiveness of an atomizer wheel as a solid particle grinder and demonstrates the effectiveness of calcium chloride as a chemical means of causing limestone particulate sub-division acting while the slurry is passing thru the wheel. It is anticipated that with the combined use of $CO_2$ and $CaCl_2$, a still further increase in surface area would be obtained.

Figure 3:
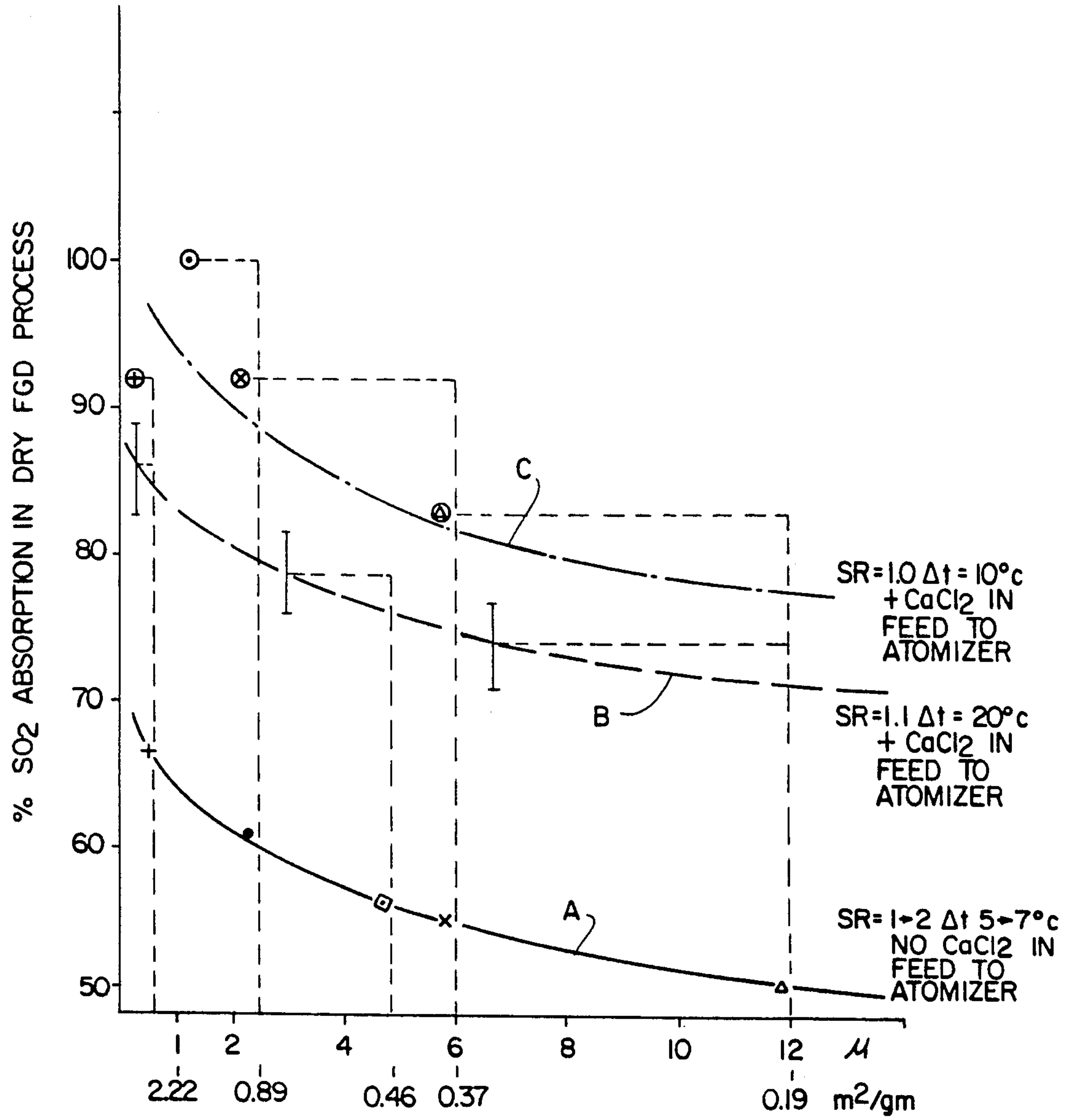
FIG. 3 is a graph showing the SO2 removal efficiency of micron and sub-micron limestone particulates made by the process as used in a dry FGD operation comprising a spray dryer followed by a baghouse gas/solid particulate reactor.

FIG. 3 is a composite of data illustrating the applicability of the products of the process of this invention to a dry flue gas desulfurization operation comprising an atomizer wheel spray dryer and a baghouse. Each point is an experimental point (or the average of several points as indicated) obtained from a dry flue gas desulfurization pilot plant of 2000 CFM gas throughput gas capacity. Critical parameters illustrated are the interrelated effects of: (1) particle size (surface area per gram); (2) the effectiveness of $CaCl_2$ as a means of particle subdivision while passing through the atomizer wheel; (3) the effect of spray dryer outlet temperature expressed as degrees centigrade above the dew point of the exit gas from the spray dryer; (4) the ratio (stoichmetric ratio=SR) of mols of calcium carbonate used per mol of $SO_2$ captured.

The lower curve (A) of FIG. 3 defined by points +, . , ◇, X, and Δ show $SO_2$ capture obtainable using calcium carbonate particles having a weight mean-particle diameter of 0.6 micron, 2.5 micron, 4.8 micron, 6 micron, and 12 micron corresponding to surface areas of 3.7, 0.89, 0.46, 0.37 and 0.19 $m^2$/gram as feed material to an atomizer wheel in a dry FGD operation. The data were plotted using the predicted smaller size of the particles issuing from the wheel which is caused by the grinding action of the wheel as demonstrated by the data shown in FIG. 2. The maximum $SO_2$ capture obtained was about 66% using the 0.6 micron feed material.

The middle curve (B), with limits indicated, represents a bulk of data obtained based on the predicted particle size of the material issuing from the wheel using as a feed to the wheel calcium carbonate particles having a weight-mean particle size of 0.6, 4.8 and 12 microns in combination with calcium chloride using a stoichiometric ratio of 1.1 mols calcium carbonate per mol $SO_2$. The outlet of the spray dryer was maintained at a point 20° C. above the dew point.

The upper curve (C) is located by reference to the four experimental points: ⊕, ⊙, Ⓧ and Δ⃝ obtained using calcium chloride added to the indicated: 0.6 micron, 2.5 micron, 6 micron, and 12 micron diameter calcium carbonate fed to the FGD process. A stoichiometric ratio of 1 and a dryer exit temperature of 10° C. above the dew point of the exit gas were employed.

Based on the data presented in FIG. 3, utilizing the teaching of this invention, a preferred operation of a dry FGD system as herein described, can obtain over 90% capture of $SO_2$ from a flue gas stream using as the material fed to the atomizer wheel, calcium carbonate having a weight average particle diameter of six microns or less and containing not less than about two percent calcium chloride using a stoichiometric ratio of approximately one and a dryer outlet temperature near 10° C. above the dew point. The approximately six micron diameter feed material is preferably made in a tower mill where approximately ¼ mesh limestone particulates are reduced in size to approximately six microns by abrasive grinding in the presence of dissolved carbon dioxide and calcium chloride.

What is claimed is:

1. A dry flue gas desulfurization process comprising:
(a) dispersing an aqueous media containing finely divided calcium carbonate particulates having a weight average diameter of 10 microns or less in a gas stream containing sulfur oxides;
(b) passing the gas stream containing the calcium carbonate particulates to a particle separation zone; and
(c) recovering the calcium carbonate particulates from the gas stream substantially free of sulfur oxides; said aqueous media containing finely divided calcium carbonate particulates being produced by a process comprising the steps of:
(i) forming a slurry of calcium carbonate in an aqueous media;
(ii) adding carbon dioxide from an external source to said slurry; and
(iii) abrasively grinding the calcium carbonate in said slurry in the presence of said carbon dioxide to produce said finely divided calcium carbonate particulates.

2. The process of claim 1 wherein said calcium carbonate particulates have a weight average diameter of less than five microns.

3. The process of claim 2 comprising, in step (iii), abrasively grinding the calcium carbonate to a weight average diameter of from about 6–10 microns in a tower mill and further abrasively grinding the product from the tower mill using an atomizer wheel to a weight average diameter of less than five microns.

4. A dry flue gas desulfurization process comprising:
(a) dispersing an aqueous media containing finely divided calcium carbonate particulates having a weight average diameter of 10 microns or less in a gas stream containing sulfur oxides;
(b) passing the gas stream containing the calcium carbonate particulates to a particle separation zone; and
(c) recovering the calcium carbonate particulates from the gas stream substantially free of sulfur oxides; said aqueous media containing finely divided calcium carbonate particulates being produced by a process comprising the steps of:
(i) forming a slurry of calcium carbonate in an aqueous media;
(ii) adding an acid which produces carbon dioxide in the aqueous media to said slurry; and
(iii) abrasively grinding the calcium carbonate in said slurry in the presence of said carbon dioxide to produce said finely divided calcium carbonate particulates.

5. The process of claim 4 wherein said calcium carbonate particulates have a weight average diameter of less than five microns.

6. The process of claim 5 comprising, in step (iii), abrasively grinding the calcium carbonate to a weight average diameter of from about 6–10 microns in a tower mill and further abrasively grinding the product from the tower mill using an atomizer wheel to a weight average diameter of a few microns or less.

7. A dry flue gas desulfurization process comprising:
(a) dispersing an aqueous media containing finely divided calcium carbonate particulates having a weight average diameter of 10 microns or less in a gas stream containing sulfur oxides;
(b) passing the gas stream containing the calcium carbonate particulates to a particle separation zone; and
(c) recovering the calcium carbonate particulates from the gas stream substantially free of sulfur oxides; said aqueous media containing finely divided calcium carbonate particulates being produced by a process comprising the steps of:
(i) forming a slurry of calcium carbonate in an aqueous media;
(ii) adding to said slurry carbon dioxide from an external source and a soluble acid-forming compound, the anion of which forms water soluble calcium compounds; and (iii) abrasively grinding the calcium carbonate in said slurry in the presence of said carbon dioxide and said soluble acid-forming compound to produce said finely divided calcium carbonate particulates.

8. The process of claim 7 wherein said calcium carbonate particulates have a weight average diameter of less than five microns.

9. The process of claim 8 comprising, in step (iii), abrasively grinding the calcium carbonate to a weight average diameter of from about 6–10 microns in a tower mill and further abrasively grinding the product from the tower mill using an atomizer wheel to a weight average diameter of less than five microns

10. The process of claim 7 comprising, in step (iii), abrasively grinding the calcium carbonate in the presence of said carbon dioxide and calcium chloride.

* * * * *